(12) United States Patent
Narita et al.

(10) Patent No.: US 6,237,634 B1
(45) Date of Patent: May 29, 2001

(54) MANUALLY OPERATED SUPPLY AND EXHAUST CHANGEOVER VALVE FOR FLUID PRESSURE APPARATUS

(75) Inventors: Masaru Narita; Bunya Hayashi; Makoto Ishikawa, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/327,506

(22) Filed: Jun. 8, 1999

(30) Foreign Application Priority Data

Jul. 2, 1998 (JP) .................................................. 10-187382

(51) Int. Cl.[7] .................................................. F16K 11/044
(52) U.S. Cl. .................................. 137/625.27; 137/627.5; 137/884; 251/251
(58) Field of Search ..................... 251/251; 137/625.25, 137/625.67, 627.5, 884

(56) References Cited

U.S. PATENT DOCUMENTS

| | | | | |
|---|---|---|---|---|
| 3,240,231 | * | 3/1966 | Cadiou | 137/625.67 |
| 5,149,053 | | 9/1992 | Galli . | |
| 5,236,017 | * | 8/1993 | Meyer et al. | 137/884 X |
| 5,459,953 | * | 10/1995 | Fukano et al. | 137/884 X |
| 5,497,806 | * | 3/1996 | Swank et al. | 137/625.25 |
| 5,520,144 | * | 5/1996 | Philo et al. | 251/251 X |
| 5,586,570 | * | 12/1996 | Fukano et al. | 137/884 X |
| 5,682,918 | * | 11/1997 | Stoll et al. | 137/627.5 X |
| 5,762,094 | * | 6/1998 | Hendershot et al. | 137/627.5 X |
| 5,944,056 | * | 8/1999 | Miyazoe et al. | 137/884 X |
| 6,076,491 | * | 6/2000 | Allen | 251/263 X |

FOREIGN PATENT DOCUMENTS

| | | | |
|---|---|---|---|
| 1 396 | | 9/1938 | (DE) . |
| 20 23 814 | | 9/1971 | (DE) . |
| 81 03 396 | | 7/1981 | (DE) . |
| 338341 | * | 11/1930 | (GB) ................................ 137/627.5 |
| 1110945 | * | 4/1968 | (GB) ................................ 137/627.5 |

* cited by examiner

Primary Examiner—John Rivell
Assistant Examiner—Meredith H. Schoenfeld
(74) Attorney, Agent, or Firm—Oblon, Spivak, McClelland, Maier & Neustadt, P.C.

(57) ABSTRACT

To provide a changeover valve for a fluid pressure apparatus which can be easily manufactured, assembled and incorporated into piping, and of which the maintenance is easy. For this purpose, there are provided a supply body 1 having a supply passage 8 extending from an introduction port 6 of fluid under pressure to a supply port 30a of a fluid pressure apparatus 30, an exhaust body 2 having an exhaust passage 9 extending from the exhaust port 30 of the fluid pressure apparatus 30 to a fluid exhaust port 7, and a retainer 3 being provided between the supply body 1 and the exhaust body 2 and having a passageway 10 communicating the supply passage 8 with the exhaust passage 9, a valve member 4 opening and closing a valve seat 12 provided in the passage way 10 and a valve seat 11 provided in the supply passage 8 of the supply body 1, and operating means 5 manually opening and closing the valve member 4.

7 Claims, 3 Drawing Sheets

MANUALLY OPERATED SUPPLY AND EXHAUST CHANGEOVER VALVE FOR FLUID PRESSURE APPARATUS

FIELD OF THE INVENTION

The present invention relates to a supply and exhaust changeover valve for a fluid pressure apparatus being mounted at a supply port and an exhaust port of the fluid pressure apparatus when a trial operation, an operation check and so on of the fluid pressure apparatus are performed so that supplying and exhausting of fluid under pressure are controlled manually.

PRIOR ART

When performing a trial operation, maintenance services, and an operation check during adjustment of various fluid pressure apparatuses, it is necessary to make sure whether or not these apparatuses are operating properly, by manually supplying or exhausting fluid under pressure such as compressed air to and from the apparatuses while confirming safety. Further, in some cases, it is necessary to take precautions against unexpected events. Although opening-and-closing valves or directional control valves are generally provided in the pressurized-fluid piping for fluid pressure apparatuses, they are not suitable for supplying or exhausting fluid under pressure for the purpose of above operation checks and the like.

In order to manually supply or exhaust fluid under pressure to and from the fluid pressure apparatus as stated above, a manually operated opening-and-closing valve and the like may be provided in the piping. In the case of such an opening-and-closing valve, however, it is normally required that they can be switched between a first changeover position wherein a supply port of a fluid pressure apparatus is in communication with a fluid supply source through an introduction port of the opening-and-closing valve as well as an exhaust port of the fluid pressure apparatus is opened to the outside through the exhaust port of the opening-and-closing valve, and a second changeover position wherein the supply port and the exhaust port of the fluid pressure apparatus are both opened through the exhaust port of the opening-and-closing valve. Therefore, even if a simply structured opening-and-closing valve is installed, it cannot be conveniently utilized. Moreover, it is also required for such an opening-and-closing valve to be easily manufactured, assembled and incorporated into the piping.

SUMMARY OF THE INVENTION

It is therefore a technological object of the present invention to provide a manually operated supply and exhaust changeover valve for a fluid pressure apparatus which meets the above-mentioned requirements, can be easily manufactured, assembled and incorporated into the piping, and of which the maintenance is easy.

In accordance with the present invention, the above-stated objectives are achieved by provision of a supply and exhaust changeover valve, which is directly mounted at a supply port and an exhaust port of a fluid pressure apparatus so as to be operated manually to supply and exhaust fluid under pressure to and from the fluid pressure apparatus.

This changeover valve comprises a supply body and an exhaust body being formed separately and connected with each other by joining means. The supply body comprises a fluid introduction port, a fitting portion for connection to the supply port of the fluid pressure apparatus, and a supply passage for connecting the introduction port with the fitting portion. Further, the exhaust body comprises a fluid exhaust port, a fitting portion for connection to the exhaust port of the fluid pressure apparatus, and an exhaust passage for connecting the fluid exhaust port with the fitting portion. The supply passage and the exhaust passage of the both bodies are brought into communication with each other by a hollow retainer provided between their joined portions, and a first valve seat is provided at the midpoint position of the supply passage and a second valve seat is provided on the retainer. Furthermore, there are provided a valve member between these valve seats for alternately opening and closing the two valve seats and operating means for manually opening and closing the valve member.

The supply and exhaust changeover valve having the above construction is mounted at a supply port and an exhaust port of a fluid pressure apparatus arranged side by side, and a changeover of supply and exhaust of fluid under pressure to and from the fluid pressure apparatus is carried out by manually operating the operation means to open and close the valve member. Since the valve member to switch the flow of fluid under pressure is manually operated, it is possible to control supply and exhaust of the fluid under pressure while confirming safety. Moreover, because the above valves are directly mounted at the supply port and the exhaust port of the fluid pressure apparatus, it is very easy for them to be incorporated in the piping, which enables the valve to be most suitable for checking an operation and the like of the fluid pressure apparatus.

Also, the supply body, the exhaust body and the retainer are separately formed and incorporated in the above supply and exhaust changeover valve so that it is relatively easy to form each member compared to integral forming of the both bodies. Moreover, since it is possible to incorporate the valve member in sequence easily while assembling the above members, manufacturing of the valve can be done very easily.

Moreover, because the supply and exhaust changeover valve can easily be disassembled into such members, its maintenance is easy, its components can be replaced easily and it can be adjusted easily.

According to a specific embodiment of the present invention, the first valve seat and the second valve seat are located in opposed positions, the valve member has a first poppet opening and closing the first valve seat and a second poppet opening and closing the second valve seat between the both valve seats, and the valve members and the retainer are incorporated in sequence into the above-mentioned supply body from the joint surface side.

According to another specific embodiment of the present invention, the operating means comprises a first spring provided on the side of one end of the valve member to press the valve member in one direction, a second spring for return provided on the side of the other end of the valve member to press the valve member in the opposite direction, and a manually operated operating member having a camming surface to press the valve member through the first spring.

According to another preferable embodiment of the present invention, quick-connecting pipe fittings attachable to the supply port and the exhaust port of the fluid pressure apparatus are mounted respectively at a fluid introduction port of the supply body and a fluid exhaust port of the exhaust body, and the fitting portions of the both bodies are each connectible to the supply port and the exhaust port of the fluid pressure apparatus by the same connection structure as that of the pipe fittings.

DESCRIPTION OF THE PREFERRED EMBODIMENTS

Figure 1:
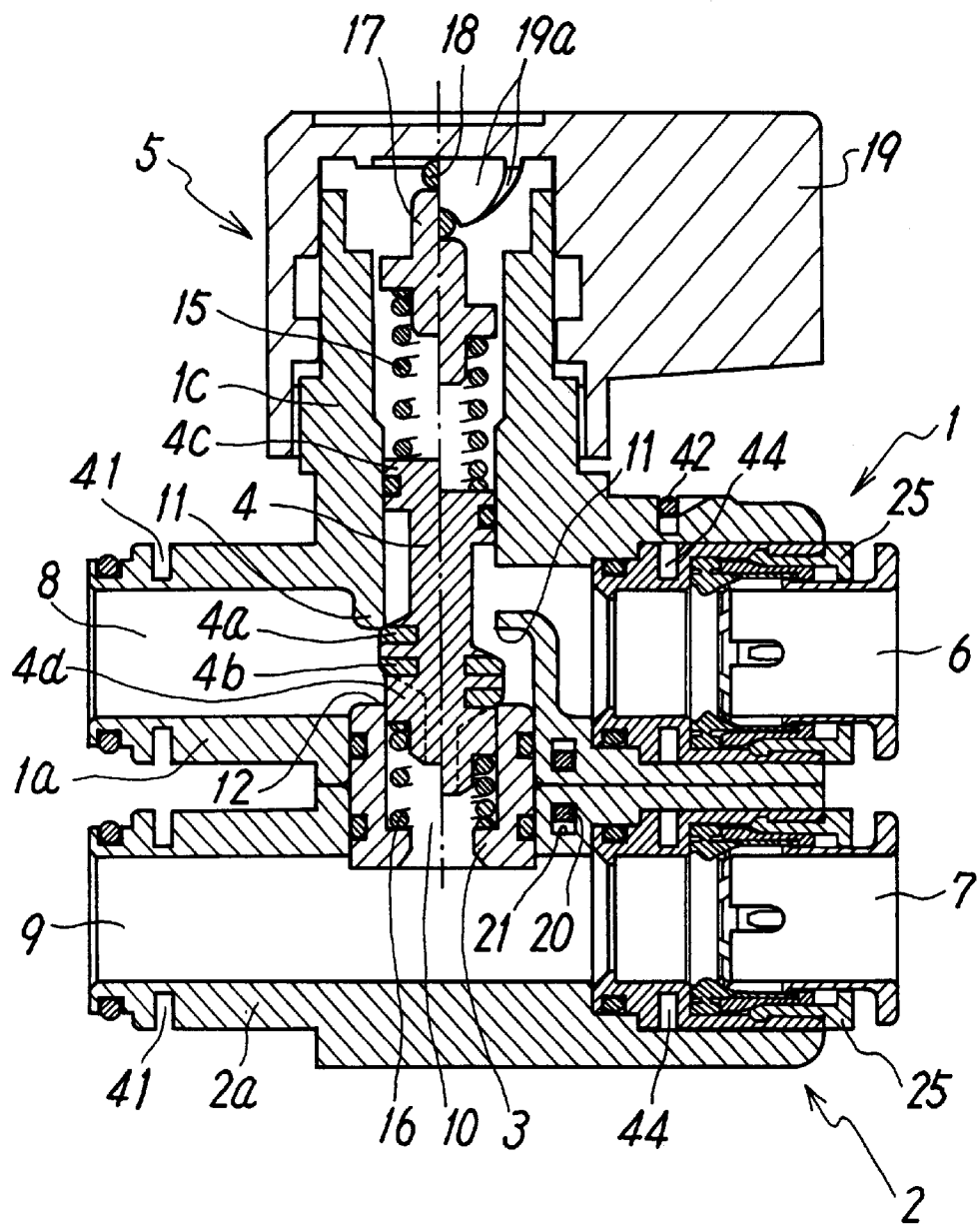
FIG. 1 is a longitudinal sectional side view showing an embodiment of a manually operated supply and exhaust changeover valve of the present invention.
Figure 2:
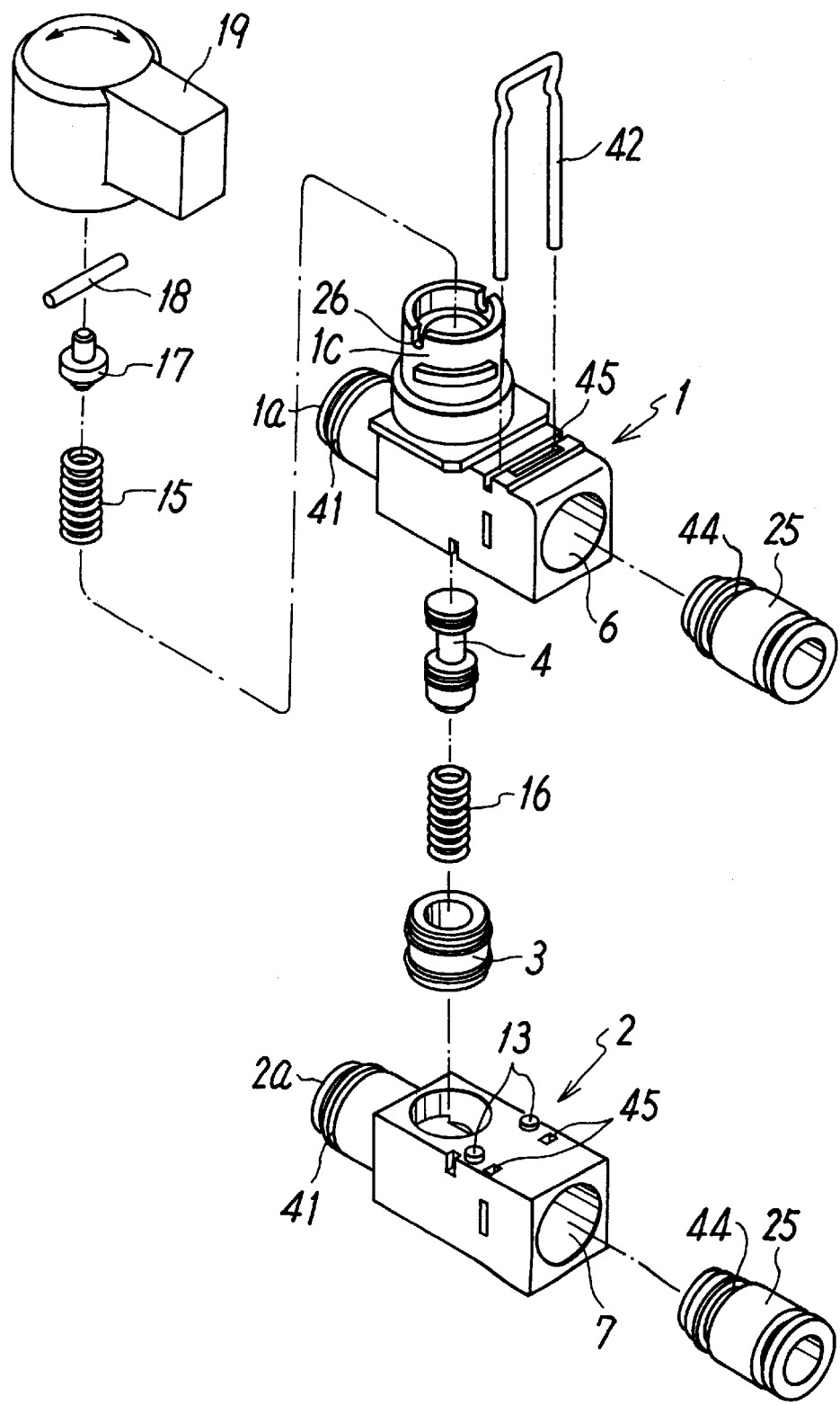
FIG. 2 is an exploded view in perspective of the changeover valve.
Figure 3:
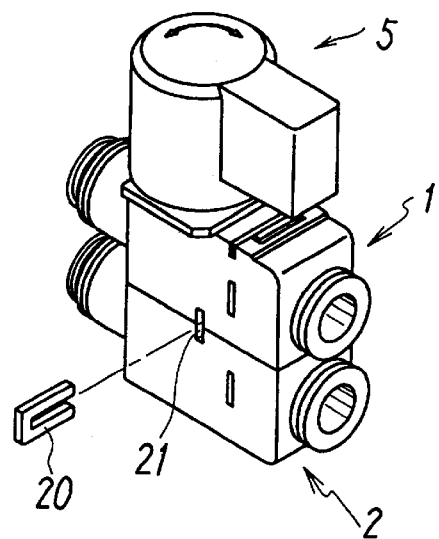
FIG. 3 is a perspective view of the changeover valve.

FIGS. 1 through 4 show an embodiment of a manually operated supply and exhaust changeover valve of the present invention. This changeover valve comprises a supply body 1 for supplying compressed air to a fluid pressure apparatus, an exhaust body 2 for exhausting the compressed air from the fluid pressure apparatus to the outside, a retainer 3 disposed between the supply body 1 and the exhaust body 2, a valve member 4 provided to move up and down in the supply body 1, and an operating means 5 for manually operating the valve member 4.

Figure 4:
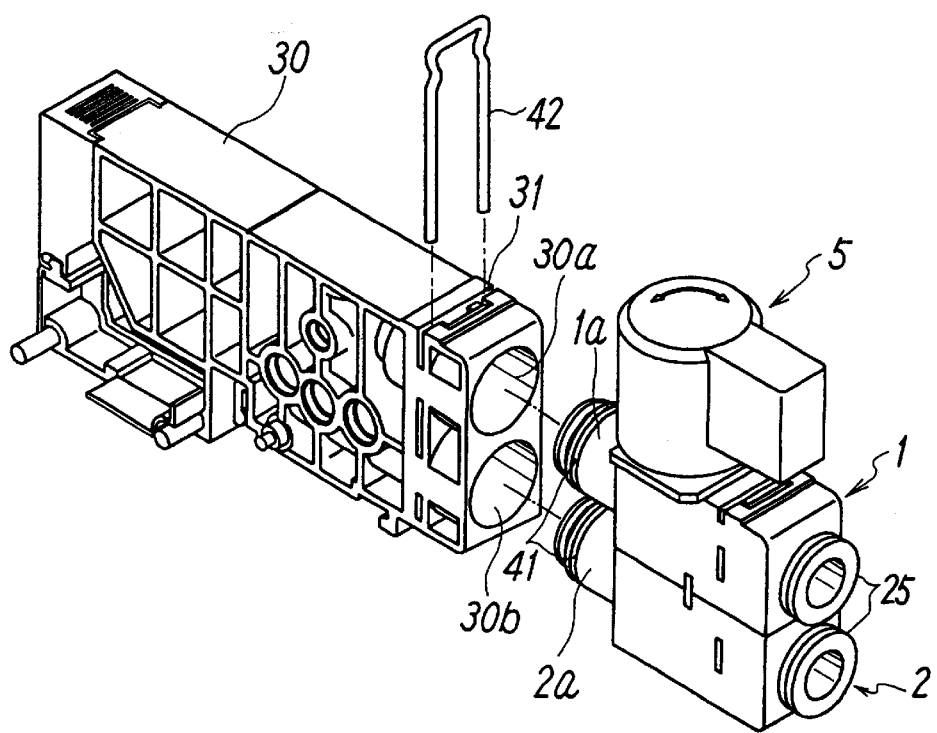
FIG. 4 is a perspective view showing a state of use of the changeover valve.

As a fluid pressure apparatus 30 to which the above changeover valve is connected, shown in FIG. 4 is a supply and exhaust block for collectively supplying and exhausting compressed air to and from a plurality of electromagnetic valves placed in a group. However, the fluid pressure apparatuses are not limited to such a supply and exhaust block, and various fluid-pressure operated apparatuses with a supply port 30a and an exhaust port 30b arranged side by side can be used.

The above supply body 1 has an introduction port 6 into which compressed air is supplied, a fitting portion 1a for connection to a supply port 30a of the fluid pressure apparatus 30, and a supply passage 8 which extends from the introduction port 6 and reaches the fitting portion 1a through an inside portion of the body 1. A quick-connecting pipe fitting 25 for connecting a piping tube is mounted at the introduction port 6.

Furthermore, the fitting portion 1a formed on the supply body 1 has the same connection structure as that of the pipe fitting (the pipe fitting 25 mounted at the introduction port 6) normally mounted at the supply port 30a, and is structured to be mounted at the supply port 30a in the same way as the pipe fitting is mounted.

The above exhaust body 2 has a fluid exhaust port 7 for letting out exhaust gases from the fluid pressure apparatus 30, a fitting portion 2a for insertion into the supply port 30b of the fluid pressure apparatus 30, and an exhaust passage 9 extending from the fitting portion 2a through the body 2 to be in communication with the fluid exhaust port 7. As in the case of the supply body 1, a pipe fitting 25 is mounted at the fluid exhaust port 7.

The supply body 1 and the exhaust body 2 are each separately formed and joined integrally. So as not to separate easily, they are joined by fittingly inserting a substantially U-shaped mounting hardware 20 into connecting holes 21 provided in respective bodies. The numeral 13 in FIG. 1 denotes projections to position the supply body 1 on the exhaust body 2. Further, when the supply and exhaust changeover valve is used, the respective fitting portions 1a, 2a of the supply body 1 and the exhaust body 2 are mounted at the supply port 30a and the exhaust port 30b of the fluid pressure apparatus 30 so that the both bodies 1, 2 are held in a joined state. The above mounting hardware 20 is therefore allowed to have a construction such that it can simply and easily connect the both bodies 1, 2 on the side of the introduction port 6 and the fluid exhaust port 7.

At mutually corresponding positions on the joint surface of the supply body 1 and the exhaust body 2, there is a hole, which brings the supply passage 8 and the exhaust passage 9 into communication, provided sequentially and perpendicularly to the passages 8, 9, and the above retainer 3 is hermetically fitted into this hole.

This retainer 3 is in a generally cylindrical shape, and is installed across the supply body 1 and the exhaust body 2 so as to join the both bodies with each other, and its bore serves as a passageway 10 to bring the supply passage 8 and the exhaust passage 9 into communication with each other.

The valve seats 11, 12, which the above valve member 4 contacts or departs from, are respectively provided inside the supply passage 8 and on the retainer 3 of the supply body 1. Namely, at the midpoint position of the supply passage 8, the first valve seat 11, which is closed by the contact of the valve member 4, is provided to block a flow of compressed air coming into the supply passage 8 from the introduction port 6. Also, on the upper edge of the retainer 3, the second valve seat 12, which is closed by the contact of the valve member 4 to block the passageway 10, is provided.

The valve member 4 passes through the first valve seat 11 formed on the supply block 1, with a top end extending into the retainer 3, and its axial movement switches the fluid flow in the supply passage 8. By installing the valve member 4 and the retainer 3 one by one from a side of the joint surface of the supply body 1, the poppet portion of the valve member 4 is mounted so as to be located between the first valve seat 11 in the supply passage and the second valve seat 12 on the retainer 3.

The above valve member 4 is a poppet valve which comprises a first poppet 4a contacting and separating from the first valve seat 11 from the joint surface side of the both bodies 1, 2, a second poppet 4b contacting and separating from the second valve seat 12 of the above retainer 3 from inside of the supply body 1, a sliding portion 4c fitting in a mount portion 1c of the operating means 5 on the supply body 1, and a plurality of ribs 4d being disposed radially at the bottom portion of the valve member 4 and sliding in the bore of the above retainer 3 while leaving a passage between the bore surface and the ribs.

Therefore, at a first changeover position where the first poppet 4a of the above valve member 4 contacts with the first valve seat 11, the introduction port 6 of the supply body 1 and the supply passage 8 are blocked, as well as the supply passage 8 on the side of the fitting portion 1a of the supply body 1 is in communication with a fluid exhaust port 7 of the exhaust body 2 through a passage between the ribs 4d, and an exhaust passage 9 is directly in communication with the fluid exhaust port 7. On the other hand, at a second changeover position where a second poppet portion 4b contacts a second valve seat 12, the introduction port 6 and the supply passage 8 are in communication, as well as the exhaust passage 9 is in communication with the fluid exhaust port 7.

Accordingly, at the above second changeover position, compressed air is supplied to the fluid pressure apparatus 30 through the supply and exhaust changeover valve, and exhaust gases from the fluid pressure apparatus 30 are let out through the exhaust passage 9. On the other hand, at the above first changeover position, the supply port 30a and the exhaust port 30b of the fluid pressure apparatus 30 communicate with the exhaust passage 9, allowing residual pressure in the fluid pressure apparatus 30 to be exhausted.

The above operating means 5 comprises a first spring 15 provided on a top side of the above valve member 4, a spring seat member 17 mounted on a top side of the first spring 15, a pin 18 disposed to be long sideways on a top portion of the spring seat member 17, an operating member 19 having a tilted camming surface 19a which gradually presses the pin 18 as it rotates, and a second spring 16 for a return placed below the ribs 4d at the bottom of the valve member 4. The elasticity of the second spring 16 is adjusted to be smaller than that of the first spring 15.

The above operating member 19 is rotatably mounted on a top end of a hollow mount portion 1c provided integrally on the upper surface of the supply body 1. Inside the mount portion 1c, the first spring 15, the spring seat member 17 and the pin 18 are received in this order between the valve member 4 and the operating member 19. Also, the second spring 16 is placed on a spring seat, which is fixedly provided inside the retainer 3.

Further, on the upper end of the above mount portion 1c, a longitudinal guide slot 26 is formed for both ends of the above pin 18 to be fitted in. The pin 18 is supported in the guide slot 26 in such a way that it is movable vertically within the length of the slot but its rotary movement about the center of the mount portion 1c is restricted.

When switching the position of the above valve member 4 by the above operating means 5 from the first changeover position to the second changeover position, the operating member 19 is rotated to gradually press the valve member 4 downward by a camming surface 19a of the operating member 19 so that the spring seat member 17 presses the valve member 4 downward via the spring 15. Accordingly, the valve member 4 moves downward against the action of the second spring member 16 and is switched to the second changeover position. In addition, when returning the above valve member 4 to the first changeover position, the above operating member 19 is rotated in the opposite direction to release the pressure of the first spring 15 so that the valve member 4 is pushed upward by the second spring 16 to return to the first changeover position.

Furthermore, the above supply and exhaust changeover valve is mounted to the fluid pressure apparatus 30 in such a way that a U-shaped mounting pin 42 is engaged in slots 41 of fitting portions 1a, 2a via pin holes 31 formed in the fluid pressure apparatus 30 while the fitting portions 1a, 2a remained inserted in the supply port 30a and the exhaust port 30b. This mounting structure is the same as that of the pipe fittings 25 mounted to the supply body 1 and the exhaust body 2. Namely, the pipe fittings 25 are also mounted in such a way that the U-shaped mounting pin 42 is engaged in the slots 44 formed in the fittings via pin holes 45 formed in the supply body 1 and the exhaust body 2. Therefore, the pipe fittings 25 are directly secured to the fitting portions 1a, 2a of the fluid pressure apparatus by means of the mounting pin 42.

The supply and exhaust changeover valve having above construction for a fluid pressure apparatus operates in such a way that the fitting portions 1a, 2a are fitted in the supply port 30a and the exhaust port 30b of the fluid pressure apparatus 30, the valve member 4 is activated by the manually operated operating means 5, and the changeover between supply and exhaust of compressed air to and from the fluid pressure apparatus 30 is performed. Namely, when the above valve member 4 is switched to the second changeover position to close the second valve seat 12 and the passageway 10 as well as to release the first valve seat 11, the introduction port 6 and the supply port 30a turn to be in communication, and so do the exhaust port 30b and the fluid exhaust port 7. Furthermore, when the valve member 4 is switched to the first changeover position to close the first valve seat 11 and release the second valve seat 12, the communication between the introduction port 6 and the supply passage 8 is blocked, and both the supply port 30a and the exhaust port 30b turn to be in communication with the fluid exhaust port 7.

Thus, since above valve member 4 is constructed to be changed over manually, the supply and exhaust of compressed air can be carried out while confirming safety. Moreover, the above valve member 4 is so constructed as to be directly mounted at the supply port 30a and the exhaust port 30b of the fluid pressure apparatus 30, its incorporation into the piping is very easy and the valve member is most suitable for checking the operation and the like of the fluid pressure apparatus 30.

Furthermore, the supply body 1 and the exhaust body 2 as well as the retainer 3 are formed separately as simply shaped members so that the valve member 4 and the retainer 3 are fitted in one by one from the joint surface side to be mounted to the supply body 1, and this allows each member to be formed relatively easy, the valve member 4 to be easily incorporated in sequence while the members are being assembled, which considerably facilitates the manufacturing process.

In addition, the members can be easily divided into each piece even when maintenance services are performed, which provides good maintainability, and replacement as well as adjustment of the members are also easy.

In the above embodiment, the operating means 5 comprises the first spring 15, the second spring 16, the spring seat member 17, the pin 18 and the operating member 19. However, any construction for the operating means 5 can be adopted as far as the valve member is operated manually.

As described above in detail, according to the changeover valve for fluid pressure apparatus of the present invention, the valve member to switch the flow of compressed air is operated manually so that supply and exhaust of compressed air can be controlled while confirming safety. Moreover, the changeover valve is directly mounted at a supply port and an exhaust port of the fluid pressure apparatus, which allows the valve to be incorporated into the piping very easily and to be most suitable for checking operation and the like of the fluid pressure apparatus.

What is claimed is:

1. A supply and exhaust changeover valve for manually supplying and exhausting fluid under pressure to and from a fluid pressure apparatus, comprising:

a supply body having an introduction port for fluid under pressure, a first fitting portion for connection to a supply port of said fluid pressure apparatus, and a supply passage communicating the introduction port and the first fitting portion;

an exhaust body having a fluid exhaust port, a second fitting portion for connection to an exhaust port of said fluid pressure apparatus, and an exhaust passage communicating the fluid exhaust port with the second fitting portion;

joining means for joining said supply body and said exhaust body;

a hollow retainer provided between said supply body and said exhaust body, and configured to communicate said supply passage with said exhaust passage through an inner passageway thereof;

a first valve seat provided at a midpoint position of said supply passage and a second valve seat provided in the inner passageway of said hollow retainer;

a valve member positioned and configured to selectively contact with and separate from one of said first and second valve seats to alternately open and close the supply passage and the inner passageway; and operating means for operating said valve member.

2. A changeover valve according to claim 1, wherein:

said first valve seat and said second valve seat are provided spacedly and in an opposed relationship;

said valve member has a first poppet positioned between said first and second valve seats and configured to open and close said first valve seat and a second poppet positioned between said first and second valve seat and configured to open and close said second valve seat; and said valve member and said hollow retainer are incorporated in sequence from the joint surface side into said supply body.

3. A changeover valve according to claim 1, wherein said operating means has a first spring provided on a first end of said valve member to press said valve member in one direction, a second spring for return provided on a second end of said valve member to press said valve member in an opposite direction to the one direction, and a manually operated operating member having a camming surface to press said valve member through said first spring.

4. A changeover valve according to claim 1, wherein said hollow retainer serves as part of said joining means for joining said supply and exhaust bodies by being installed between said supply and exhaust bodies.

5. A changeover valve according to claim 1, further comprising a plurality of quick-connecting pipe fittings each configured to connect to a supply port and an exhaust port of a fluid pressure apparatus, each of said plurality of quick-connecting pipe fittings being respectively mounted at the fluid introduction port of said supply body and the fluid exhaust port of said exhaust body, wherein the first and second fitting portions of said supply and exhaust bodies respectively have the same connective structure as a connective structure of said plurality of quick-connecting pipe fittings, and are configured to connect to said supply port and said exhaust port of said fluid pressure apparatus by the same manner as said plurality of quick-connecting pipe fittings.

6. A changeover valve according to claim 2, wherein said operating means has a first spring provided on a first end of said valve member to press said valve member in one direction, a second spring for return provided on a second end of said valve member to press said valve member in an opposite direction to the one direction, and a manually operated operating member having a camming surface to press said valve member through said first spring.

7. A supply and exhaust changeover valve for manually supplying and exhausting fluid under pressure to and from a fluid pressure apparatus, comprising:

a supply body having an introduction port for fluid under pressure, a first fitting portion for connection to a supply port of said fluid pressure apparatus, and a supply passage communicating the introduction port and the first fitting portion;

an exhaust body having a fluid exhaust port, a second fitting portion for connection to an exhaust port of said fluid pressure apparatus, and an exhaust passage communicating the fluid exhaust port with the second fitting portion;

at least one joint member positioned and configured to join said supply body and said exhaust body;

a hollow retainer provided between said supply body and said exhaust body, and configured to communicate said supply passage with said exhaust passage through an inner passageway thereof;

a first valve seat provided at a midpoint position of said supply passage and a second valve seat provided in the inner passageway of said hollow retainer;

a valve member positioned and configured to selectively contact with and separate from one of said first and second valve seats to alternately open and close the supply passage and the inner passageway; and a cam device positioned and configured to operate said valve member.

* * * * *